(12) United States Patent
Mahgerefteh et al.

(10) Patent No.: US 7,492,976 B2
(45) Date of Patent: Feb. 17, 2009

(54) FLAT DISPERSION FREQUENCY DISCRIMINATOR (FDFD)

(75) Inventors: Daniel Mahgerefteh, Los Angeles, CA (US); Duncan John William Walker, Somerville, MA (US); Roeland Nuyts, Utrecht (NL)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 11/441,944

(22) Filed: May 26, 2006

(65) Prior Publication Data

US 2006/0274993 A1    Dec. 7, 2006

Related U.S. Application Data

(63) Continuation of application No. 10/680,607, filed on Oct. 6, 2003, now Pat. No. 7,054,538, which is a continuation-in-part of application No. 10/289,944, filed on Nov. 6, 2002, now Pat. No. 6,963,685.

(60) Provisional application No. 60/416,102, filed on Oct. 4, 2002.

(51) Int. Cl.
    *G02F 1/295*      (2006.01)
(52) U.S. Cl. .......................................................... 385/4
(58) Field of Classification Search ...................... 385/4, 385/15, 24, 27
See application file for complete search history.

(56) References Cited

U.S. PATENT DOCUMENTS

| | | | |
|---|---|---|---|
| 3,324,295 A * | 6/1967 | Harris | ......................... 398/183 |
| 3,999,105 A | 12/1976 | Archey et al. | |
| 4,038,600 A | 7/1977 | Thomas et al. | |
| 4,561,119 A | 12/1985 | Epworth | |
| 4,805,235 A | 2/1989 | Henmi | |
| 4,841,519 A | 6/1989 | Nishio | |
| 5,293,545 A | 3/1994 | Huber | |
| 5,325,378 A | 6/1994 | Zorabedian | |
| 5,371,625 A | 12/1994 | Wedding et al. | |
| 5,412,474 A * | 5/1995 | Reasenberg et al. | ......... 356/486 |
| 5,416,629 A | 5/1995 | Huber | |
| 5,465,264 A | 11/1995 | Buhler et al. | |
| 5,477,368 A | 12/1995 | Eskildsen et al. | |

(Continued)

FOREIGN PATENT DOCUMENTS

GB      2107147      4/1983

(Continued)

OTHER PUBLICATIONS

Alexander et al., Passive Equalization of Semiconductor Diode Laser Frequency Modulation, Journal of Lightwave Technology, Jan. 1989, 11-23, vol. 7, No. 1.

(Continued)

*Primary Examiner*—Charlie Peng
(74) *Attorney, Agent, or Firm*—Workman Nydegger

(57) ABSTRACT

This invention provides a flat dispersion frequency discriminator (FDFD) capable of having a substantially flat dispersion with either a positive or negative dispersion along the spectrum region of the discriminator. This way, a FDFD may not cause substantial distortion of the intensity patter of its output to minimize the occurrence distortion due to overshooting or undershooting of the intensity pattern depending on the relative spectral alignment of the laser output relative to the filter transmission.

9 Claims, 16 Drawing Sheets

U.S. PATENT DOCUMENTS

| | | | |
|---|---|---|---|
| 5,550,667 | A | 8/1996 | Krimmel et al. |
| 5,737,104 | A | 4/1998 | Lee et al. |
| 5,777,773 | A | 7/1998 | Epworth et al. |
| 5,805,235 | A | 9/1998 | Bedard |
| 5,856,980 | A | 1/1999 | Doyle et al. |
| 5,920,416 | A | 7/1999 | Beylat et al. |
| 5,953,139 | A | 9/1999 | Nemecek et al. |
| 5,974,209 | A | 10/1999 | Cho et al. |
| 6,081,361 | A | 6/2000 | Adams et al. |
| 6,096,496 | A | 8/2000 | Frankel |
| 6,104,851 | A | 8/2000 | Mahgerefteh |
| 6,115,403 | A | 9/2000 | Brenner et al. |
| 6,222,861 | B1 | 4/2001 | Kuo et al. |
| 6,271,959 | B1 | 8/2001 | Kim et al. |
| 6,298,186 | B1 | 10/2001 | He |
| 6,331,991 | B1 | 12/2001 | Mahgerefteh |
| 6,359,716 | B1 | 3/2002 | Taylor |
| 6,473,214 | B1 | 10/2002 | Roberts et al. |
| 6,506,342 | B1 | 1/2003 | Frankel |
| 6,577,013 | B1 | 6/2003 | Glenn et al. |
| 6,618,513 | B2 | 9/2003 | Evankow, Jr. |
| 6,654,564 | B1 | 11/2003 | Colbourne et al. |
| 6,665,351 | B2 | 12/2003 | Hedberg et al. |
| 6,748,133 | B2 | 6/2004 | Liu et al. |
| 6,778,307 | B2 | 8/2004 | Clark |
| 6,810,047 | B2 | 10/2004 | Oh et al. |
| 6,836,487 | B1 | 12/2004 | Farmer et al. |
| 6,847,758 | B1 | 1/2005 | Watanabe |
| 6,943,951 | B2 | 9/2005 | Kikuchi et al. |
| 6,947,206 | B2 | 9/2005 | Tsadka et al. |
| 6,963,685 | B2 | 11/2005 | Mahgerefteh et al. |
| 7,013,090 | B2 | 3/2006 | Adachi et al. |
| 7,054,538 | B2 | 5/2006 | Mahgerefteh et al. |
| 7,076,170 | B2 | 7/2006 | Choa |
| 7,123,846 | B2 | 10/2006 | Tateyama et al. |
| 7,164,865 | B2 | 1/2007 | Tatsuno et al. |
| 7,263,291 | B2 | 8/2007 | Mahgerefteh et al. |
| 7,280,721 | B2 | 10/2007 | McCallion et al. |
| 2002/0044738 | A1 | 4/2002 | Jablonski et al. |
| 2002/0154372 | A1 | 10/2002 | Chung et al. |
| 2002/0159490 | A1 | 10/2002 | Karwacki |
| 2002/0176659 | A1 | 11/2002 | Lei et al. |
| 2003/0002120 | A1 | 1/2003 | Choa |
| 2003/0067952 | A1 | 4/2003 | Tsukiji et al. |
| 2003/0099018 | A1 | 5/2003 | Singh et al. |
| 2003/0147114 | A1 | 8/2003 | Kang et al. |
| 2003/0193974 | A1 | 10/2003 | Frankel et al. |
| 2003/0210912 | A1 | 11/2003 | Leuthold et al. |
| 2004/0008933 | A1 | 1/2004 | Mahgerefteh et al. |
| 2004/0008937 | A1 | 1/2004 | Mahgerefteh et al. |
| 2004/0036943 | A1 | 2/2004 | Freund et al. |
| 2004/0096221 | A1 | 5/2004 | Mahgerefteh et al. |
| 2004/0218890 | A1 | 11/2004 | Mahgerefteh et al. |
| 2005/0100345 | A1 | 5/2005 | Welch et al. |
| 2005/0111852 | A1 | 5/2005 | Mahgerefteh et al. |
| 2005/0175356 | A1* | 8/2005 | McCallion et al. ......... 398/187 |
| 2005/0206989 | A1 | 9/2005 | Marsh |
| 2005/0271394 | A1 | 12/2005 | Whiteaway et al. |
| 2005/0286829 | A1 | 12/2005 | Mahgerefteh et al. |
| 2006/0002718 | A1 | 1/2006 | Matsui et al. |
| 2006/0018666 | A1 | 1/2006 | Matsui et al. |
| 2006/0029358 | A1 | 2/2006 | Mahgerefteh et al. |
| 2006/0029396 | A1 | 2/2006 | Mahgerefteh et al. |
| 2006/0029397 | A1 | 2/2006 | Mahgerefteh et al. |
| 2006/0228120 | A9 | 10/2006 | McCallion et al. |
| 2006/0233556 | A1 | 10/2006 | Mahgerefteh et al. |

FOREIGN PATENT DOCUMENTS

| | | |
|---|---|---|
| JP | 62-189832 | 8/1987 |
| JP | 2000-105313 | 9/1998 |
| JP | 11-031859 | 2/1999 |
| JP | 2002-267834 | 7/2001 |
| JP | 2001-291928 | 10/2001 |
| JP | 2001-320328 | 11/2001 |
| JP | 2002-243935 | 8/2002 |
| JP | 2002-267998 | 9/2002 |
| WO | 9905804 | 2/1999 |
| WO | 0104999 | 1/2001 |
| WO | WO 01/17076 | 3/2001 |
| WO | WO 01/18919 | 3/2001 |
| WO | 03005512 | 1/2003 |

OTHER PUBLICATIONS

Binder, J. et al., 10 Gbit/s-Dispersion Optimized Transmission at 1.55 um Wavelength on Standard Single Mode Fiber, IEEE Photonics Technology Letters, Apr. 1994, 558-560, vol. 6, No. 4.

Corvini, P.J. et al., Computer Simulation of High-Bit-Rate Optical Fiber Transmission Using Single-Frequency Lasers, Journal of Lightwave Technology, Nov. 1987, 1591-1596, vol. LT-5, No. 11.

Hyryniewicz, J.V., et al., Higher Order Filter Response in Coupled MicroRing Resonators, IEEE Photonics Technology Letters, Mar. 2000, 320-322, vol. 12, No. 3.

Koch, T. L. et al., Nature of Wavelength Chirping in Directly Modulated Semiconductor Lasers, Electronics Letters, Dec. 6, 1984, 1038-1039, vol. 20, No. 25/26.

Kurtzke, C., et al., Impact of Residual Amplitude Modulation on the Performance of Dispersion-Supported and Dispersion-Mediated Nonlinearity-Enhanced Transmission, Electronics Letters, Jun. 9, 1994, 988, vol. 30, No. 12.

Li, Yuan P., et al., Chapter 8: Silicon Optical Bench Waveguide Technology, Optical Fiber Communications, 1997, 319-370, vol. 111B, Lucent Technologies, New York.

Little, Brent E., Advances in MicroRing Resonators, Integrated Photonics Research Conference 2003.

Mohrdiek, S. et al., 10-Gb/s Standard Fiber Transmission Using Directly Modulated 1.55-um Quantum-Well DFB Lasers, IEEE Photonics Technology Letters, Nov. 1995, 1357-1359, vol. 7, No. 11.

Morton, P.A. et al., "38.5km error free transmission at 10Gbit/s in standard fibre using a low chirp, spectrally filtered, directly modulated 1.55um DFB laser", Electronics Letters, Feb. 13, 1997, vol. 33(4).

Prokais, John G., Digital Communications, 2001, 202-207, Fourth Edition, McGraw Hill, New York.

Rasmussen, C.J., et al., Optimum Amplitude and Frequency-Modulation in an Optical Communication System Based on Dispersion Supported Transmission, Electronics Letters, Apr. 27, 1995, 746, vol. 31, No. 9.

Shalom, Hamutal et al., On the Various Time Constants of Wavelength Changes of a DFB Laser Under Direct Modulation, IEEE Journal of Quantum Electronics, Oct. 1998, pp. 1816-1822, vol. 34, No. 10.

Wedding, B., Analysis of fibre transfer function and determination of receiver frequency response for dispersion supported transmission, Electronics Letters, Jan. 6, 1994, 58-59, vol. 30, No. 1.

Wedding, B., et al., 10-Gb/s Optical Transmission up to 253 km Via Standard Single-Mode Fiber Using the Method of Dispersion-Supported Transmission, Journal of Lightwave Technology, Oct. 1994, 1720, vol. 12, No. 10.

Yu, et al., Optimization of the Frequency Response of a Semiconductor Optical Amplifier Wavelength Converter Using a Fiber Bragg Grating, Journal of Lightwave Technology, Feb. 1999, 308-315, vol. 17, No. 2.

Lee et al., Transmission of Directly Modulated 2.5 Gb/s Signals Over 250-km of Nondispersion-Shifted Fiber by Using a Spectral Filtering Method, IEEE Photonics Technology Letters, Dec. 1996, 1725-1727, vol. 8, No. 12.

* cited by examiner

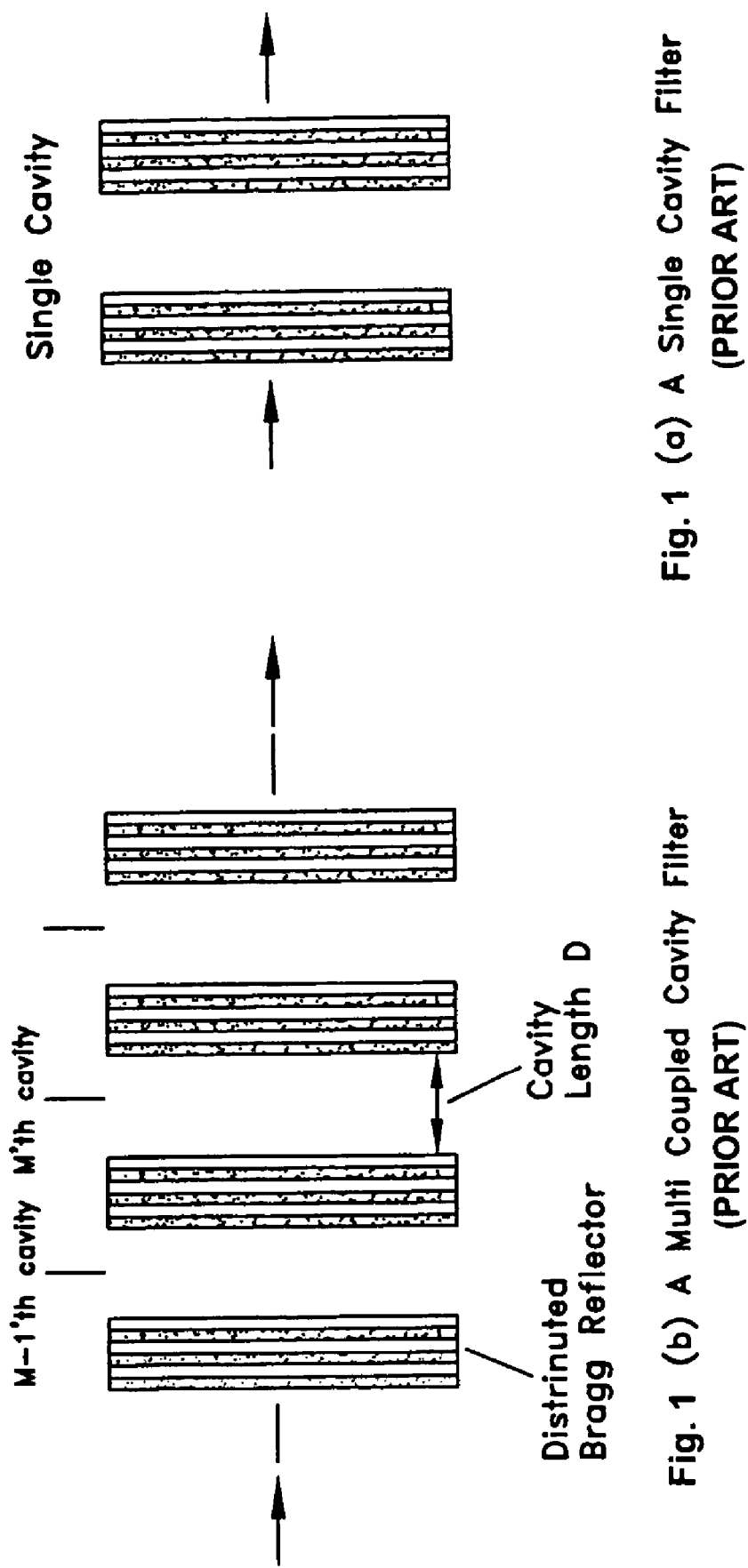
Fig. 1 (a) A Single Cavity Filter (PRIOR ART)
Fig. 1 (b) A Multi Coupled Cavity Filter (PRIOR ART)

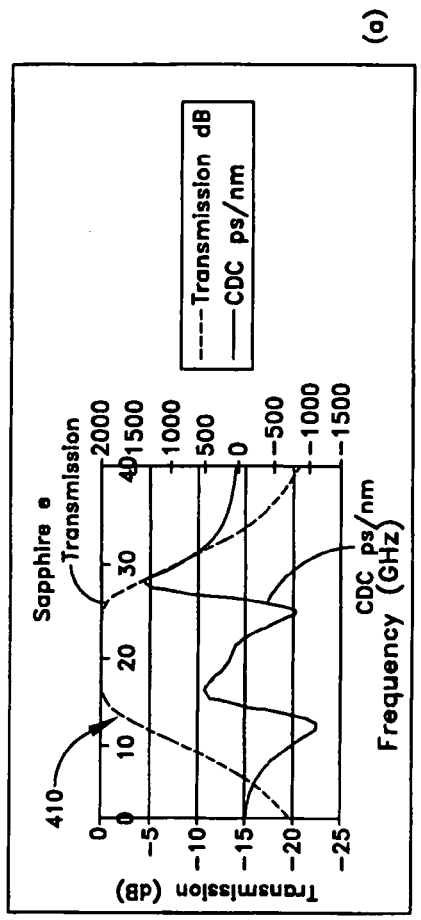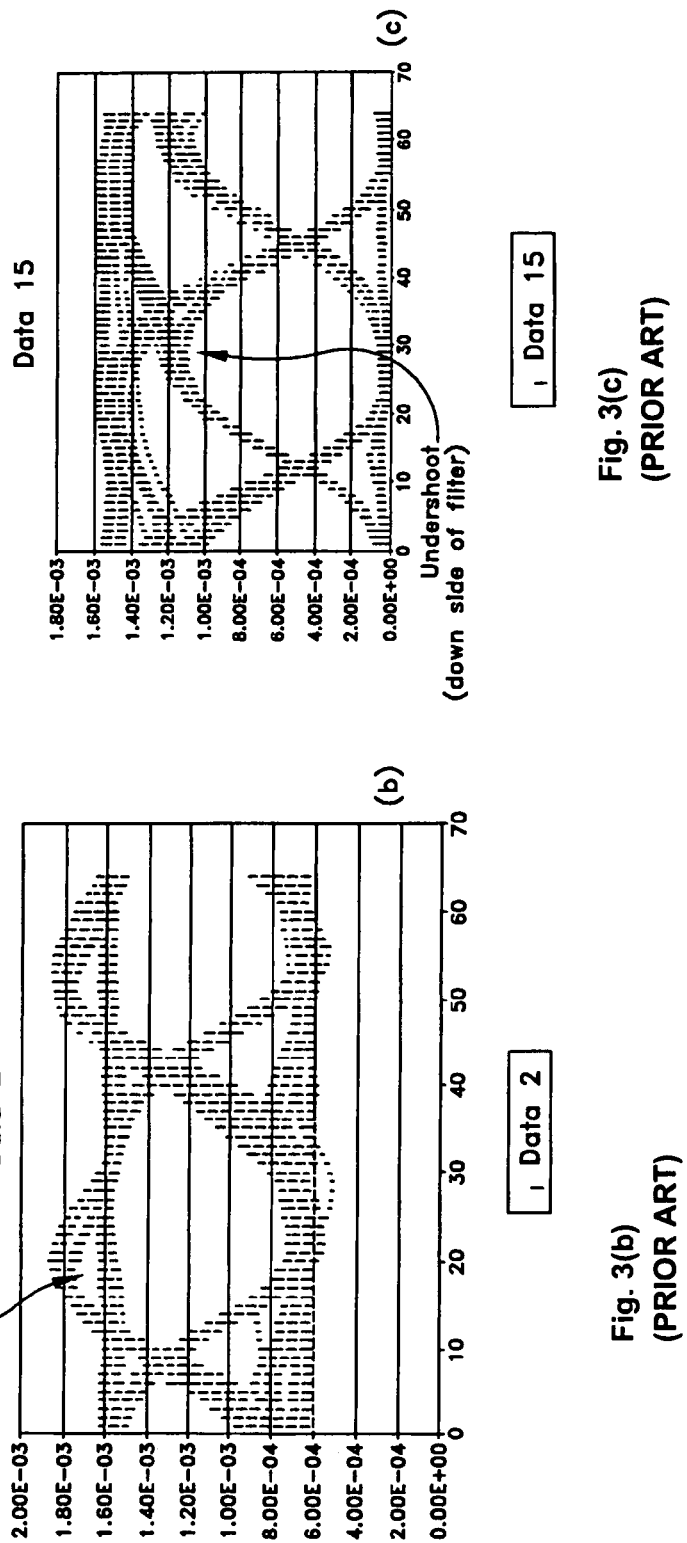
Fig. 3(a) (PRIOR ART)
Fig. 3(b) (PRIOR ART)
Fig. 3(c) (PRIOR ART)

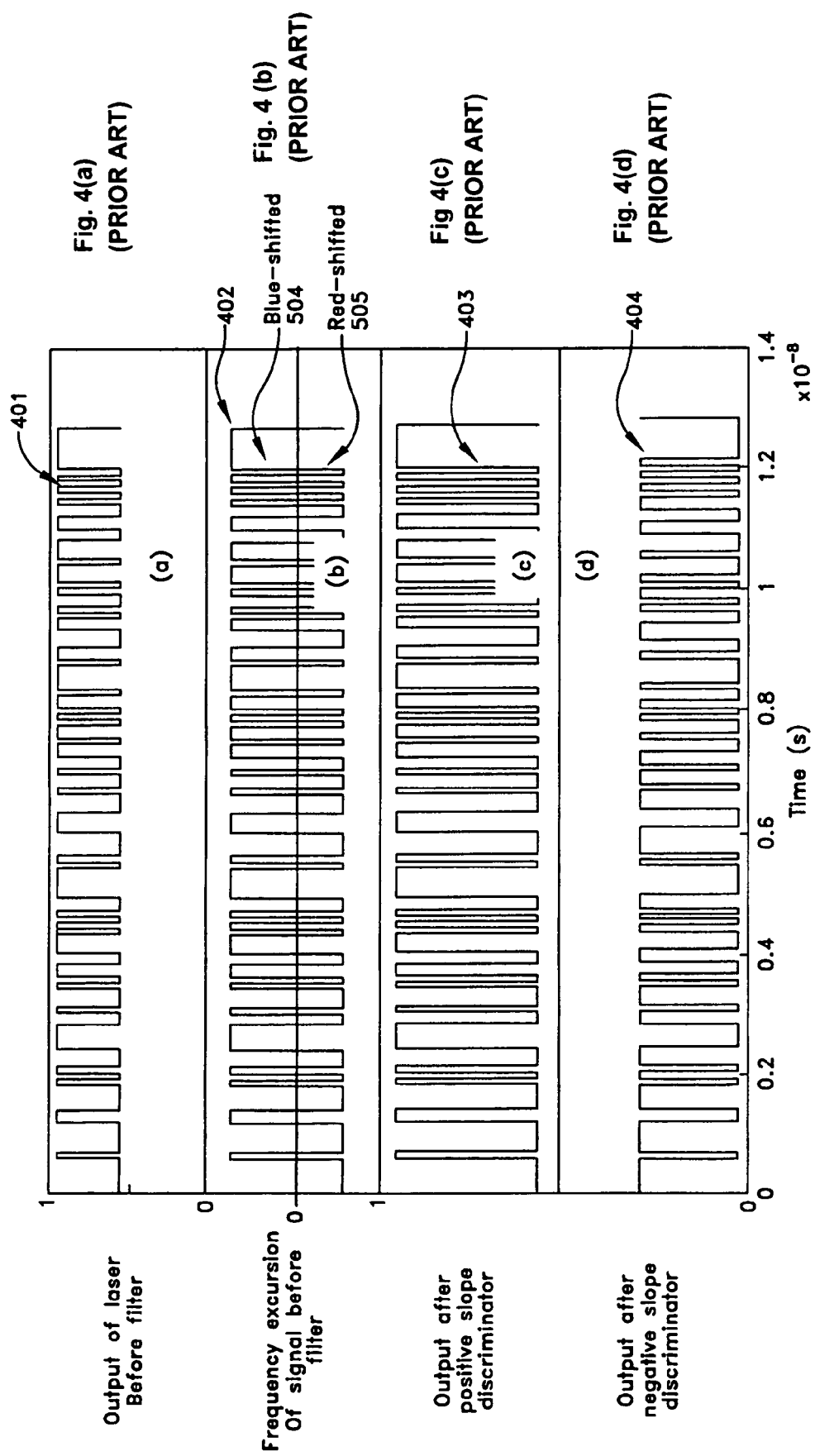

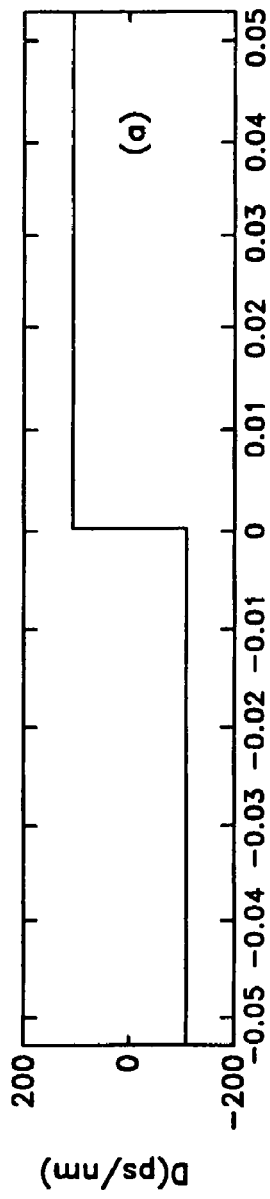
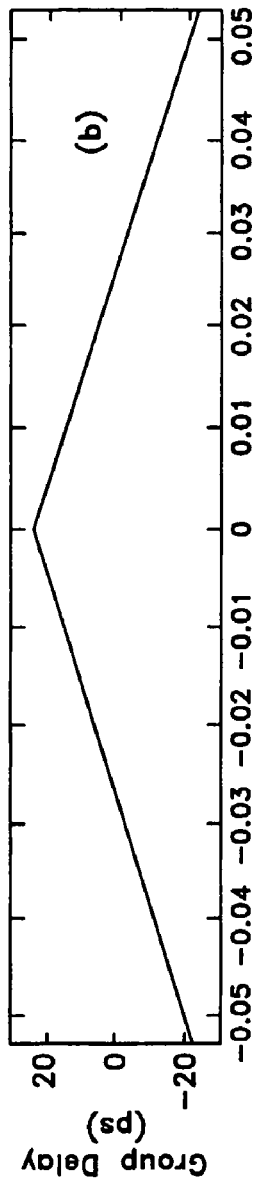
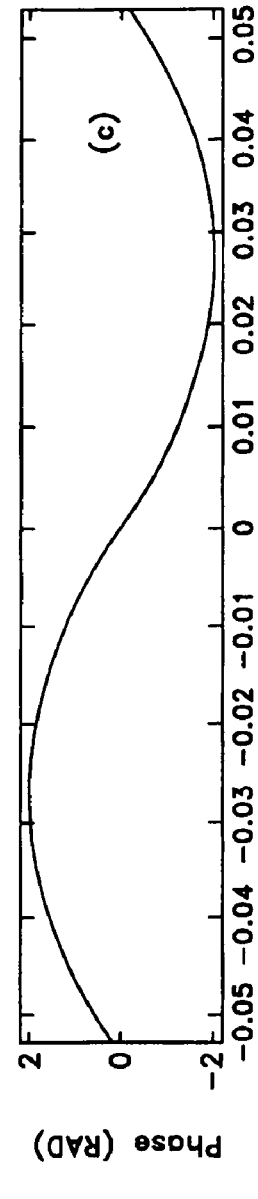
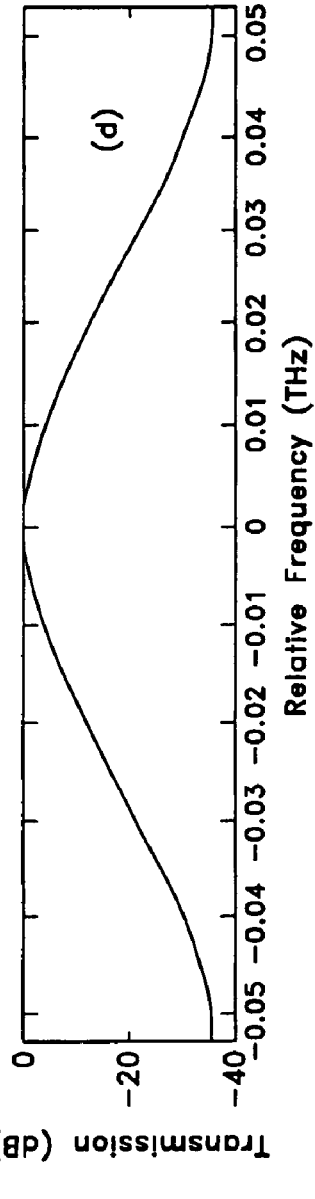
Fig. 6(a)
Fig. 6(b)
Fig. 6(c)
Fig. 6(d)

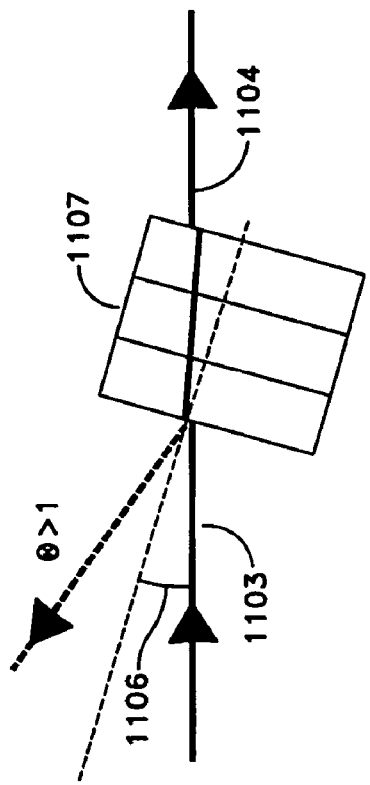
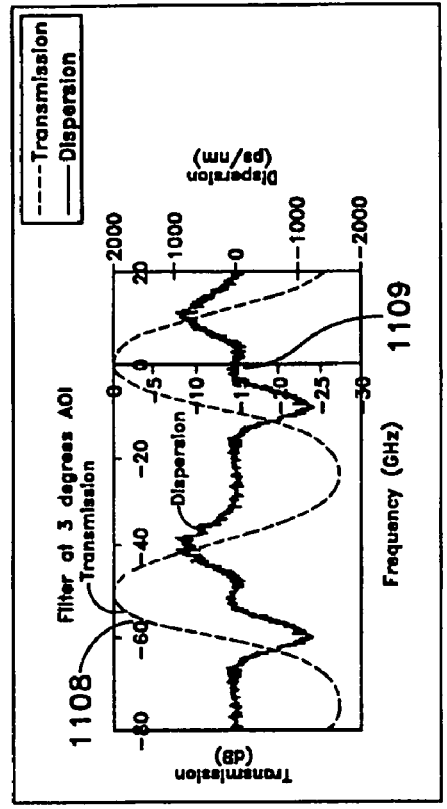
Fig. 16(b)
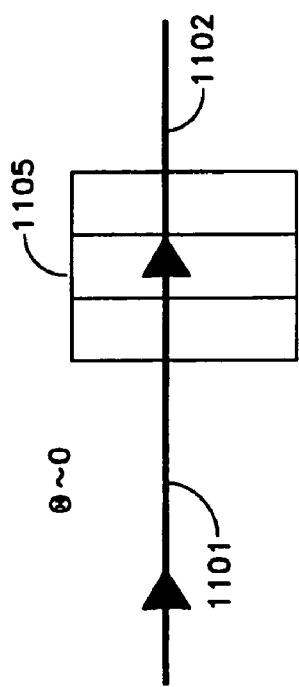
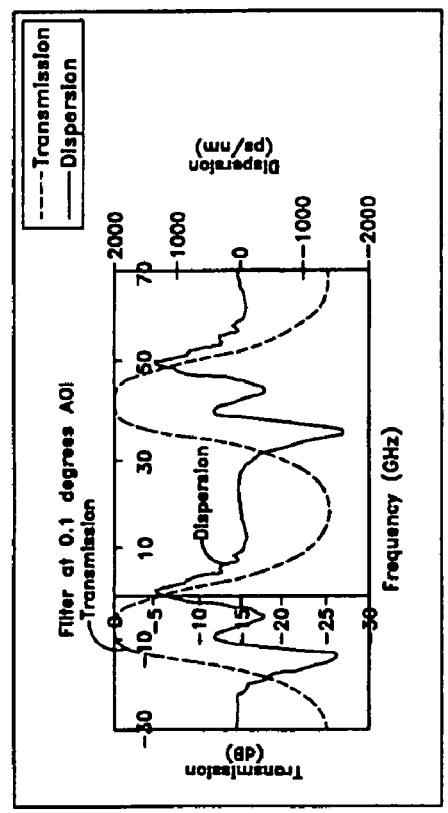
Fig. 16(a)

FLAT DISPERSION FREQUENCY DISCRIMINATOR (FDFD)

REFERENCE TO PRIOR PATENT APPLICATIONS

This patent application is a continuation of prior U.S. patent application Ser. No. 10/680,607, filed Oct. 6, 2003 now U.S. Pat. No. 7,054,538 by Daniel Mahgerefteh et al. for FLAT DISPERSION FREQUENCY DISCRIMINATOR (FDFD), which in turn:

(i) is a continuationinpart of prior U.S. patent application Ser. No. 10/289,944, filed Nov. 6, 2002 now U.S. Pat. No. 6,963,685 by Daniel Mahgerefteh et al. for POWER SOURCE FOR A DISPERSION COMPENSATION FIBER OPTIC SYSTEM; and (ii) claims the benefit of prior U.S. Provisional patent application Ser. No. 60/416,102, filed Oct. 4, 2002 by Daniel Mahgerefteh et al. for FLAT DISPERSION FREQUENCY DISCRIMINATOR (FDFD).

The above-identified applications are hereby incorporated herein by reference.

BACKGROUND OF THE INVENTION

1. Field of the Invention

This invention provides a frequency discrimination capable of providing a substantially flat dispersion in a fiber optic system.

2. General Background

A frequency modulated laser source is modulated with digital data and the resulting output is passed through an optical frequency discriminator. The input to the discriminator is arranged to have a small amplitude modulation and sufficiently large frequency modulation. The frequency discriminator (FD) increases the extinction ratio of the output. In a fiber optic transmission system, which is limited by fiber dispersion, a frequency discriminated directly modulated laser transmitter (FDDML) provides a low chirp output in a compact package.

A frequency discriminator may be chosen to partially compensate for the dispersion in the transmission fiber and convert frequency modulated (FM) signal from a laser source to substantially amplitude modulated (AM) signal. The dispersion compensation aspect may be particularly applicable for high bit rate applications such as 10 Gb/s. To achieve a high frequency discriminator slope for high bit rates, a coupled multicavity (CMC) bandpass filter may be used on the edge of its transmission. A CMC may be made from depositing thin layers of alternating materials having high (H) and low (L) refractive indices. As illustrated in FIG. 1(a), a single cavity may be formed from an integer number of layers having a thickness of $\lambda/2$, sandwiched between a stack of $\lambda/4$ thick alternating high and low index layers, where $\lambda$ is the design wavelength of light. FIG. 1(b) illustrates a CMC filter formed from a number of such cavities capable of producing a pass band and sharp slope transmission edges.

FIGS. 2(a) and 2(b) illustrate the filter transmission of a flat-top three-cavity CMC as well as its dispersion in units of ps/nm. In this FDDML, the modulated signal is spectrally aligned to be on either the positive slope 201 or the negative slope 202 of the discriminator. The discriminator may partially compensate for the dispersion of the fiber if the output signal 208 is spectrally aligned with the portion of the frequency discriminator spectrum 204, 205, 206, or 207 having dispersion opposite to that of the fiber. However, the dispersion changes sign near the transmission edges 201 and 202 so that care needs to be taken to ensure the spectral alignment.

Besides the alignment, the three-cavity design may have rapid variation of dispersion with optical frequency that causes distortions of the optical signal due to third order dispersion. Third order dispersion is the derivative of the group velocity dispersion. Accordingly, there is a need to minimize the possibility of a misalignment and the distortion in the optical signal.

The flat-top filter also tends to cause the output intensity pattern to be distorted by overshooting or undershooting the 1 bits depending on the relative spectral alignment of the laser output to the filter transmission. A non-return-to-zero digital data stream is often shown on a sampling oscilloscope in the form of an "eye diagram," as illustrated in FIG. 3, that is generated by superimposing the pulse train repeatedly on itself, each time shifting it by one bit period. FIG. 3 illustrates the eye diagram at the output of a flat top filter 300 for two different filter positions (b) and (c), showing the distortion.

FIG. 4 illustrates the output power of a directly FM modulated laser. The laser may be biased high above threshold and its bias current modulated to produce a digital signal having a 1-7 dB extinction ratio. As illustrated in FIG. 4b, due to line width enhancement, the optical frequency of the laser may undergo frequency excursion on the order of 2-15 GHz as the laser intensity is increased and decreased representing the digital bits. The frequency modulated laser signal may pass through a frequency discriminator, producing a substantially amplitude modulated signal with an extinction ratio greater than 10 dB. FIG. 4c illustrates the output of a positive slope discriminator, and FIG. 4d illustrates the output of a negative slope discriminator.

FIG. 4b illustrates that most lasers have the sign of frequency excursion as a blue shift for higher output intensities. The output of the positive slope discriminator has a higher power compared to the negative slope discriminator. However, the positive slope discriminator has a positive dispersion for the typical filter illustrated in FIG. 3 where it can only compensate for negative dispersion fiber. In order to compensate for the dispersion of standard fiber, which has positive dispersion (in units of ps/nm), the negative slope may be used near the passband, producing a reduced output power. As such, another objective of this invention is to design a CMC optical discriminator having negative dispersion on the positive slope side. A FDFD may be used for FDDML applications based on a distributed feed-back (DFB) laser.

Additionally the bandwidth of the filters is another parameter that has to be considered. A typical signal contains frequency components over a range corresponding to the data rate. For example a 10 Gb signal will contain frequency components in a 10 GHz bandwidth around the carrier frequency. As a result if the bandwidth of filters used is too narrow, this will affect the quality of the transmitted signal and in particular it will increase the rise and fall time which shows up in the eyes. FIG. 5 shows the impact on eyes when a step function is passed through two filters with a bandwidth of 12 GHz and 18 GHz, respectively. The higher bandwidth filter has a shorter rise time from the 20% to the 80% level (23 ps compared to 33 ps). To pass the SONET mask test, as required by telecom standards, a rise time that is smaller than 35 ps is required. After the signal is passed through the electrical $4^{th}$ order Bessel-Thomson filter, the rise time increases further and to pass the mask test, the rise time before the filter should be below about 35 ps. This provides a limitation on the minimum bandwidth that a filter can have in this application. Typically, the bandwidth has to be at least as large as the data rate for good quality eyes to be generated. In addition to get high extinction at the output of the discriminator, the filter has to have a high slope of 1 to 2 dB/GHz.

SUMMARY OF THE INVENTION

This invention provides a flat dispersion frequency discriminator (FDFD) capable of having a substantially flat dispersion with either a positive or negative dispersion along the spectrum region of the discriminator. This way, a FDFD may not cause substantial distortion of the intensity pattern of its output to minimize the occurrence of distortion due to overshooting or undershooting of the intensity pattern depending on the relative spectral alignment of the laser output relative to the filter transmission. This may be accomplished by providing a filter adapted to receive frequency modulated signal and output a substantially amplitude modulated signal where the filter has a spectral profile described by a quadratic coefficient of logarithmic transmission with optical frequency and a substantially negative dispersion on the high frequency side of the transmission peak and a substantially positive dispersion on the high frequency side of the transmission peak. Such a filter may be obtained by determining an ideal dispersion curve for a particular fiber optic application. Based on the ideal dispersion curve, the corresponding phase may be obtained then applying the Kramers-Kronig relationship to the curve, the transmission spectrum may be calculated.

Many modifications, variations, and combinations of the methods and systems and apparatus of a dispersion compensated optical filter are possible in light of the embodiments described herein. The description above and many other features and attendant advantages of the present invention will become apparent from a consideration of the following detailed description when considered in conjunction with the accompanying drawings.

BRIEF DESCRIPTION OF THE FIGURES

A detailed description with regard to the embodiments in accordance with the present invention will be made with reference to the accompanying Figures.

FIG. 1(a) illustrates a coupled multicavity (CMC) filter with a single cavity.

FIG. 1(b) illustrates a CMC filter with three cavities.

FIG. 3(a) illustrates an eye diagram at the output of a flat top filter.

FIG. 3(b) illustrates overshooting of the output intensity pattern at the top of the filter.

FIG. 3(c) illustrates undershooting of the output intensity pattern at the down side of the filter.

FIG. 4(a) illustrates the output power of the laser before passing through a filter.

FIG. 4(b) illustrates that most lasers have the sign of frequency excursion as a blue shift for higher output intensities.

FIG. 4(c) illustrates the output from a positive slope discriminator.

FIG. 4(d) illustrates the output from a negative slope discriminator.

FIG. 6(a) illustrates that the filter dispersion may be selected so that it is equal to a negative constant $-Dm$ for a finite band of frequencies, $2\omega_0$, on the low frequency side of a center frequency, and equal to $+Dm$ for a finite band of frequencies $2\omega_0$ on the high frequency side of the center frequency.

FIG. 6(b) illustrates a group delay relative to frequency corresponding to FIG. 6(a).

FIG. 6(c) illustrates the phase as a function of frequency corresponding to FIG. 6(a).

FIG. 6(d) illustrates the transmission intensity as a function of relative frequency corresponding to FIG. 6(a).

FIG. 16(a) illustrates an example of the transmission of a periodic three-cavity etalon filter incident with an optical beam having a small beam divergence at normal incidence.

FIG. 16(b) illustrates an example of the transmission of a periodic three-cavity etalon filter incident with an optical beam having a small beam divergence at 3 degrees angle.

DESCRIPTION OF THE INVENTION

The transmission spectrum of the FDFD filter may be determined based on the following. An ideal dispersion curve for a particular filter application is defined. Based on the ideal dispersion curve, the corresponding phase may be obtained. Then, the Kramers-Kronig relationship may be applied to calculate the transmission spectrum. A standard optimization and filter design package may be then used to synthesize the desired filter function starting from a close approximation. For example, a FDFD based on a 93 layer CMC may be used.

FIG. 6(a) illustrates that the filter dispersion may be selected so that it is equal to a negative constant $-D_m$ for a finite band of frequencies, $2\omega_0$, on the low frequency side of a center frequency, and equal to $+D_m$ for a finite band of frequencies $2\omega_0$ on the high frequency side of the center frequency. The frequency relative to the center frequency may be defined where the dispersion is defined in units of ps/nm and is related to the phase of the filter, $\phi$, by the relation:

$$D = -\frac{2\pi c}{\lambda^2}\beta_2 \equiv \frac{2\pi c}{\lambda^2}\frac{d^2\phi}{d\omega^2}, \quad (1)$$

Where D is in units of ps/nm, and $\beta_2$ is in units of $ps^2$. Because of their definitions and corresponding units, D and $\beta_2$ have opposite signs. Integrating Eq. 1 with respect to $2\omega_0$, the group. delay as illustrated in FIG. 6(b) may be obtained as a function of relative frequency:

$$\tau = -\frac{d\phi}{d\omega} \quad (2)$$

And integrating Eq. 2 with respect to $2\omega_0$, the phase as a function of frequency as illustrated in FIG. 6(c) may be obtained. The relation for the phase of a FDFD filter may be given by a piecewise continuous function:

$\phi(\omega) = -(D_m/\omega_0^2)(\omega-\omega_0)^2 + D_m$ for $-2\omega_0 \leq \omega \leq 0$ $\phi(\omega) = (D_m/\omega_0^2)(\omega+\omega_0)^2 - D_m$ for $0 \leq \omega \leq 2\omega_0$ $\phi(\omega) = 0$ otherwise (3)

The intensity transmission spectrum, $T(\omega)$, of the FDFD may be derived by using the Kramers-Kronig relation as given in *Optical Filter Design and Analysis* by C. K. Madsen and J. H. Zhao:

$$\ln\sqrt{T(\omega)} = 1 + \frac{2}{\pi}P\int_0^\infty \frac{\omega'\phi(\omega')}{\omega'^2-\omega^2}d\omega'. \quad (4)$$

Here $\omega = 2\pi f$ is angular frequency, and P stands for the principal value of the integral as defined in standard text books such as *Classical Electrodynamics* by J. D. Jackson. Since the Kramers Kronig relation is a convolution integral, it can also be solved by Fourier transformation and multiplication.

Figure 2A:
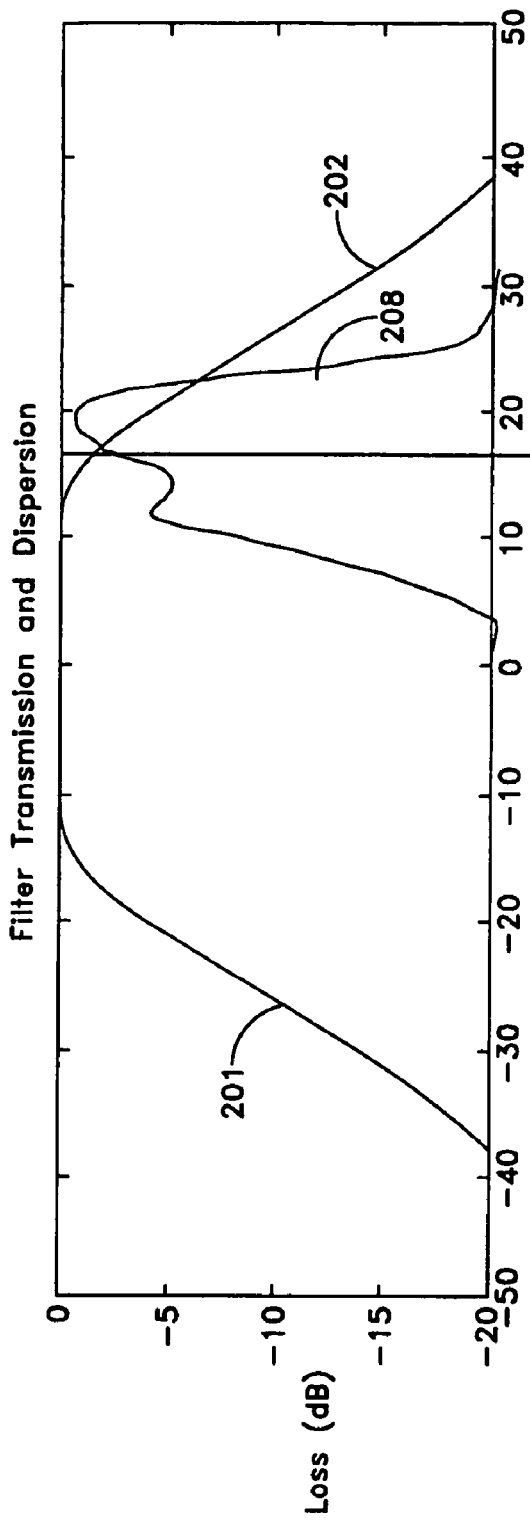
FIG. 2(a) illustrates a filter transmission from a flat top CMC filter with three cavities.
Figure 2B:
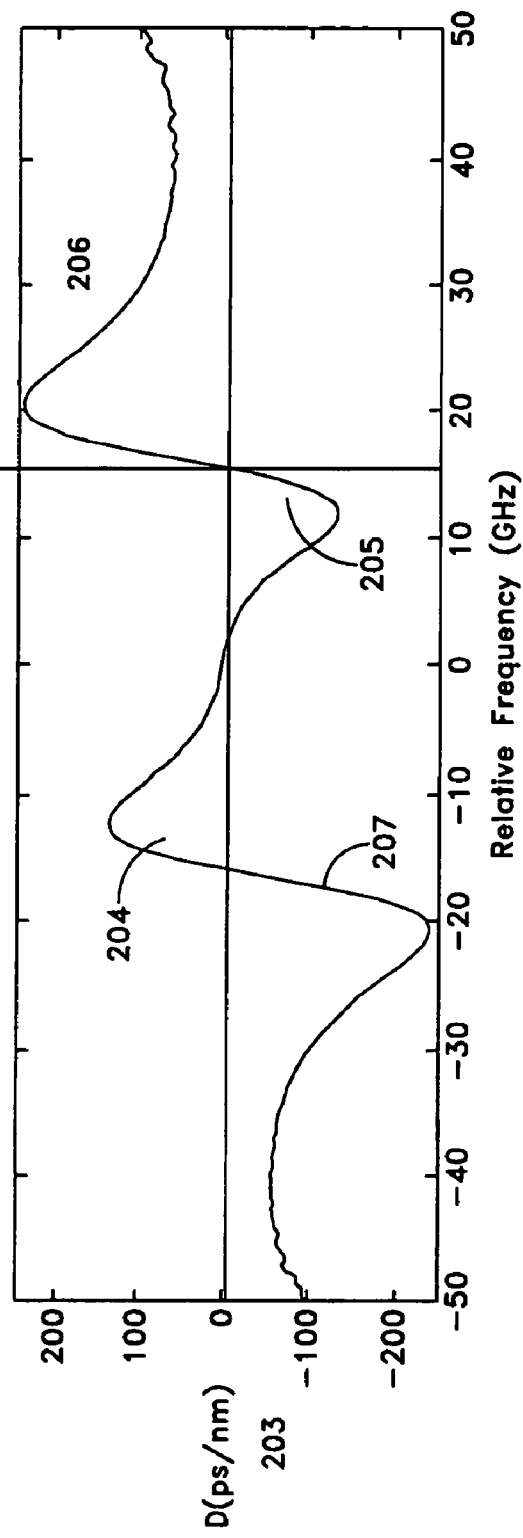
FIG. 2(b) illustrates a filter dispersion from a flat top CMC filter with three cavities.
Figures 5A, 5B:
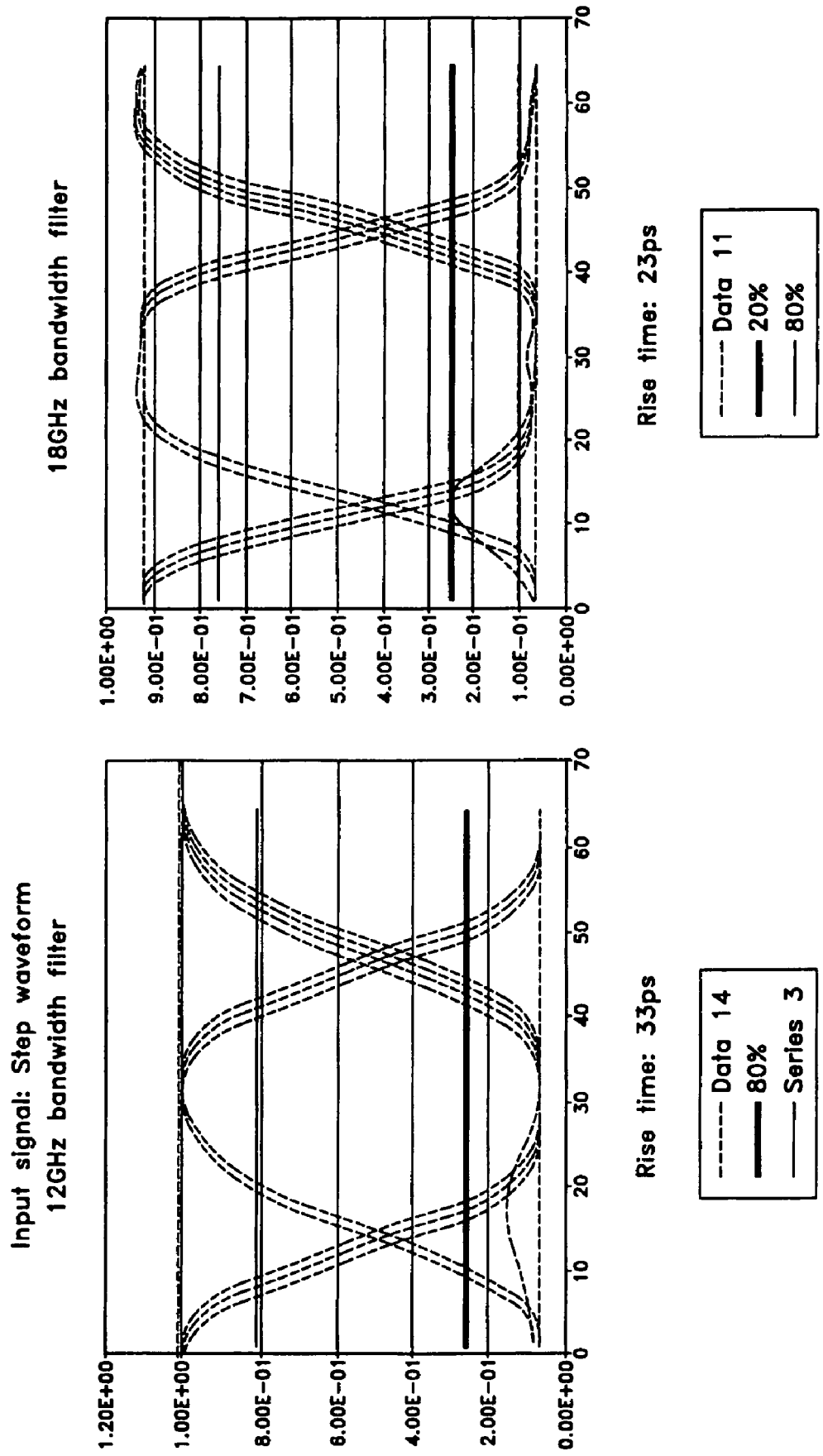
FIG. 5(a) illustrates the impact on the eye when a step function is passed through a filter with a bandwidth of 12 GHz.
FIG. 5(b) illustrates the impact on the eye when a step function is passed through a filter with a bandwidth of 18 GHz.
Figure 7:
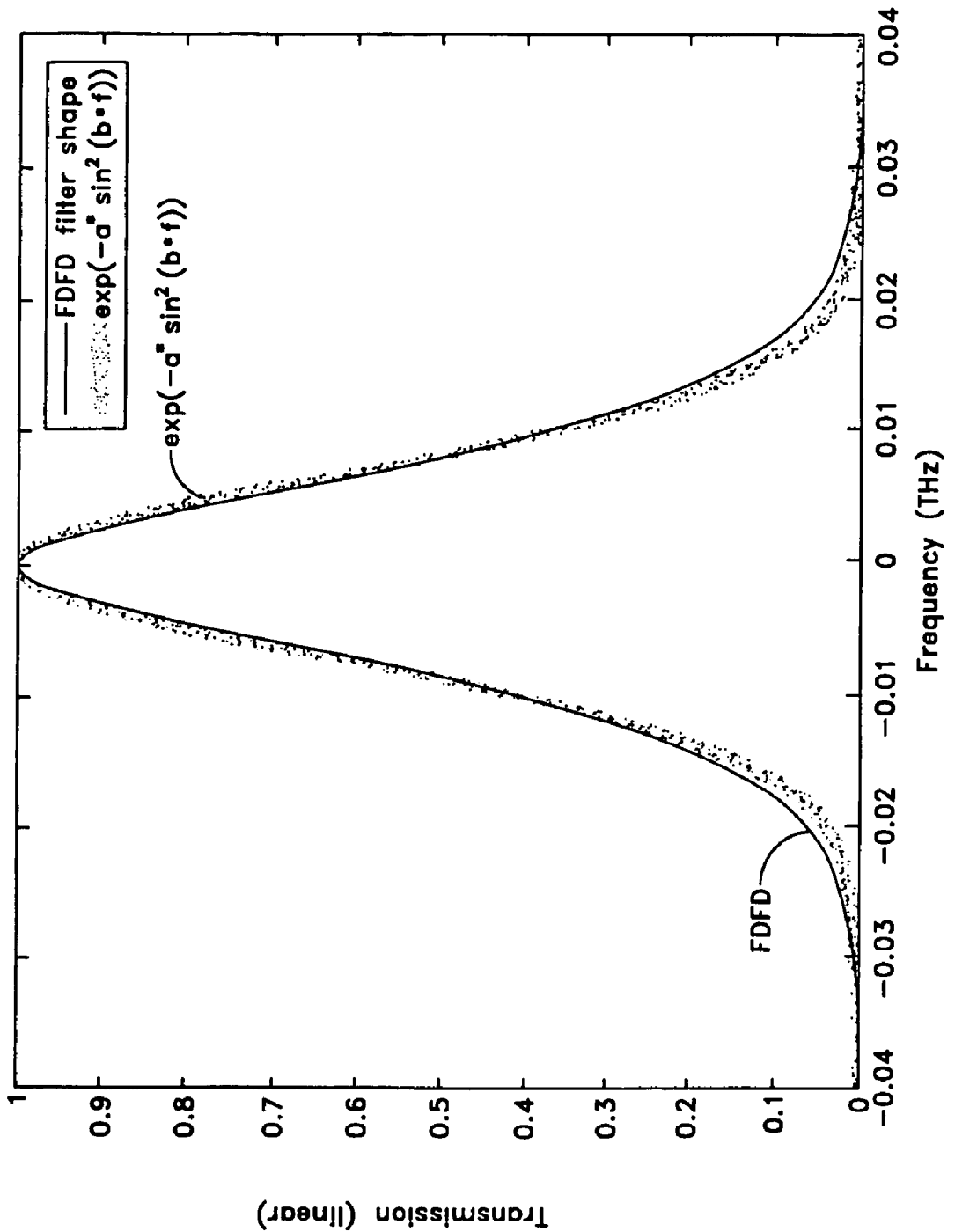
FIG. 7 illustrates another view of a transmission intensity as a function of relative frequency.

Using Eq. 3 and Eq. 4, the intensity transmission plotted may be calculated on dB scale as illustrated in FIGS. 6(d) and 7 as a function of relative frequency. The functional form of the intensity transmission may be approximated by:

$$T(\omega) = \exp(-\alpha \sin^2(\beta(\omega-\omega_0))) \quad (5)$$

where $\alpha$ and $\beta$ are fitting parameters. This functional form is a gaussian $$T(\omega) \sim \exp(-\gamma(\omega-\omega_0)^2), \quad (6)$$

near the peak of the transmission where $\beta(\omega-\omega_0) \ll 1$ up to the wings if the curve, where the transmission is very low. Since the energy of the optical signal transmitted through the filter near the high loss frequencies is small, the flat dispersion filter can be well simulated by a gaussian filter. Accordingly, one aspect of the invention is to provide a filter with spectral profile that is substantially similar to the gaussian profile near the peak of the transmission. When transmission is plotted on dB scale, as is common, the transmission of a gaussian filter will be a quadratic function of optical frequency, and can be described by a quadratic coefficient $\gamma$ in $dB/GHz^2$. A higher quadratic coefficient makes for a higher slope, higher dispersion, and typically smaller bandwidth. A frequency discriminator having a substantially quadratic transmission versus optical frequency curve on a logarithmic scale is therefore another embodiment of the present invention.

Figure 8A:
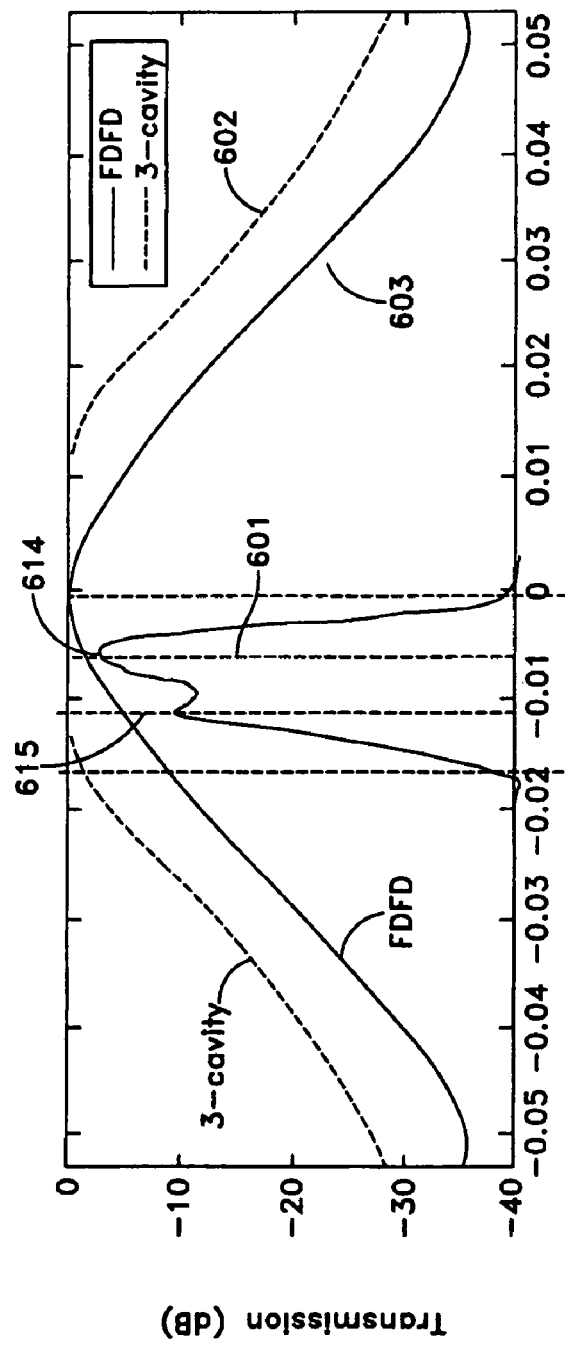
FIG. 8(a) illustrates the comparison of the transmission of the FDFD discriminator with a three-cavity CMC filter discriminator.
Figure 8B:
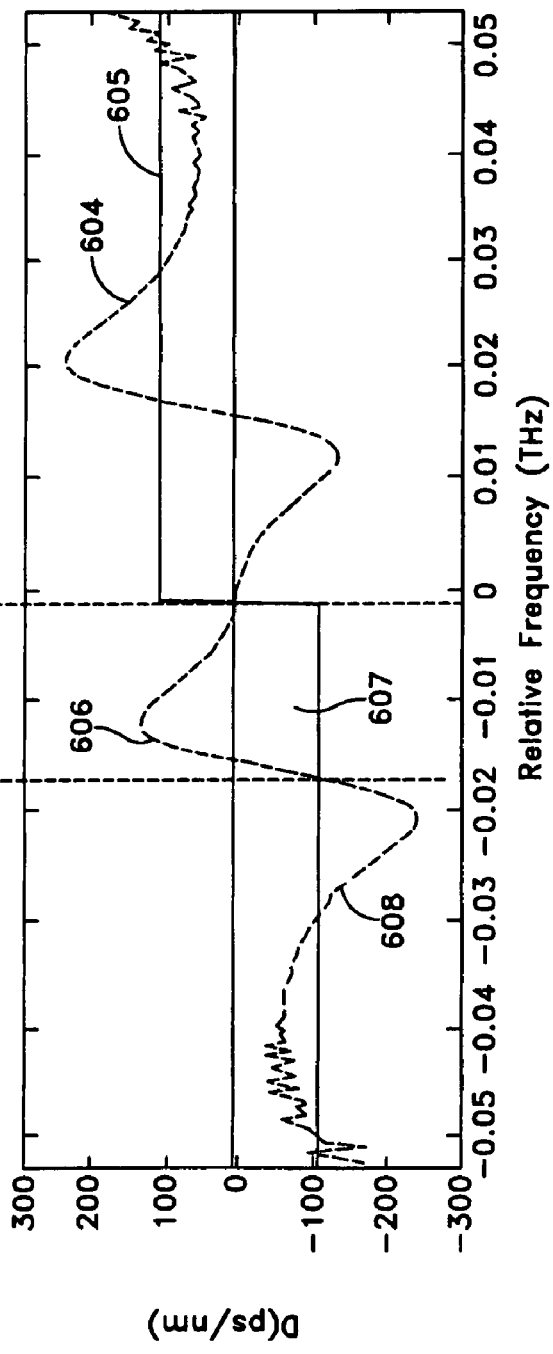
FIG. 8(b) illustrates the comparison of the dispersion of the FDFD discriminator with a three-cavity CMC filter discriminator.

FIGS. 8(a) and 8(b) illustrate the comparisons of the transmission and dispersion of the FDFD discriminator with a three-cavity coupled multicavity (CMC) filter discriminator, respectively. FIG. 8(a) illustrates the optical spectrum of the substantially frequency modulated signal 601 incident on the frequency discriminator and the transmission of the three-cavity filter 602 and the FDFD 603. Note that the spectrum 601 represents the frequency modulated NRZ input data, having two main peaks, 614, corresponding to the is bits and 615 corresponding to the zero bits. In this mode of operation, the positive slope discriminator is used and corresponds to FIG. 4(c) in the time domain. For most DFB lasers this may be the desired mode of operation because it produces a higher output power at this mode.

FIG. 8(b) illustrates the dispersion of the three-cavity filter 604 and the dispersion of the FDFD 605 as a function of relative optical frequency. As the vertical dotted lines show, the optical signal passing through the three-cavity discriminator experiences the positive dispersion peak 606, while the same signal passing through an FDFD discriminator experiences negative dispersion 607. This may also cause distortion. Therefore, the use of the FDFD provides at least a partial dispersion compensation for a standard transmission fiber, which has positive dispersion at the operating wavelength of 1.5 μm. The FDFD may also be used in the negative slope mode, where the dispersion of the filter is positive and compensate for fiber having a negative dispersion. As such, the FDFD may compensate for the dispersion in the transmission fiber compared to the standard three-cavity discriminator.

One example of the physical design of the FDFD may be demonstrated using a standard thin film simulation software such as TFcalc by Software Spectra. An example of the FDFD filter may be formed using a coupled multicavity (CMC) composed of the following stack formula:

$(LH)^9(LL)^2(HL)^9H(LH)^9(LL)^3(HL)^3(HL)^9H(LH)^{12}(LL)^2$
$(HL)^{12}$ (6)

In this formula L represents a $\lambda/4n_s$ thick layer of $SiO_2$, with refractive index $n_s = 1.47$, and H represents a $\lambda/4n_T$ thick layer of $Ta_2O_5$, with refractive index $n_T = 2.09$, where $\lambda$ is the design wavelength in vacuum. Also a quantity raised to a power means that quantity is repeated many times; for example: $(HL)^9$=HL HL HL HL HL HL HL HL HL, etc. The stack formula in (6) is a three-cavity design with 3 mirrors having, 9, 9, and 12 (HL) stacks, and three corresponding cavities having 2, 3, and 2 (LL) layers. Note that each cavity is an integer number of $\lambda/2n_S$ layers.

Figure 9:
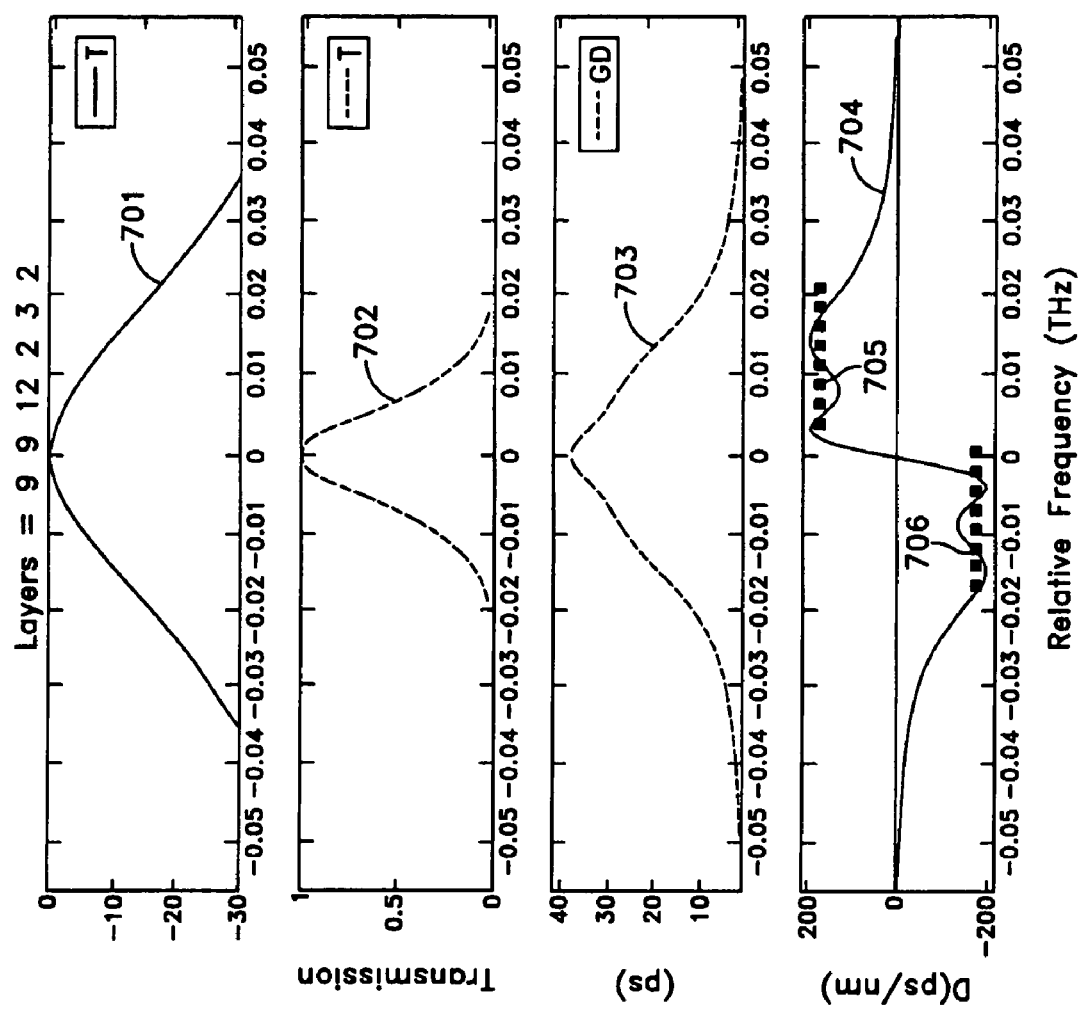
FIG. 9 illustrates the transmission on logarithmic scale, transmission on linear scale, group delay in ps, and dispersion in ps/nm as a function of relative optical frequency.

FIG. 9 illustrates the transmission on logarithmic scale, 701, transmission on linear scale, 702, group delay in ps, 703, and dispersion in ps/nm 704 as a function of relative optical frequency. The dispersion remains positive and nearly constant 705 over a bandwidth of 20 GHz on the high frequency side and remains negative and nearly constant 706 over a 20 GHz bandwidth on the low frequency side. This functional form resembles a Fourier synthesis of a square wave with a few Fourier components.

Besides the design discussed above, additional layers may be used to give more flexibility in design. That is, a large number of different stack formulae using different combinations of high and low index, different materials, can be used to produce an approximation to the dispersion flattened frequency discriminator. The specific stack formula Eq. (6) has the advantage that it is made of quarter wave thick stack of layers, which makes the thin film deposition more readily manufacturable.

Figure 10:
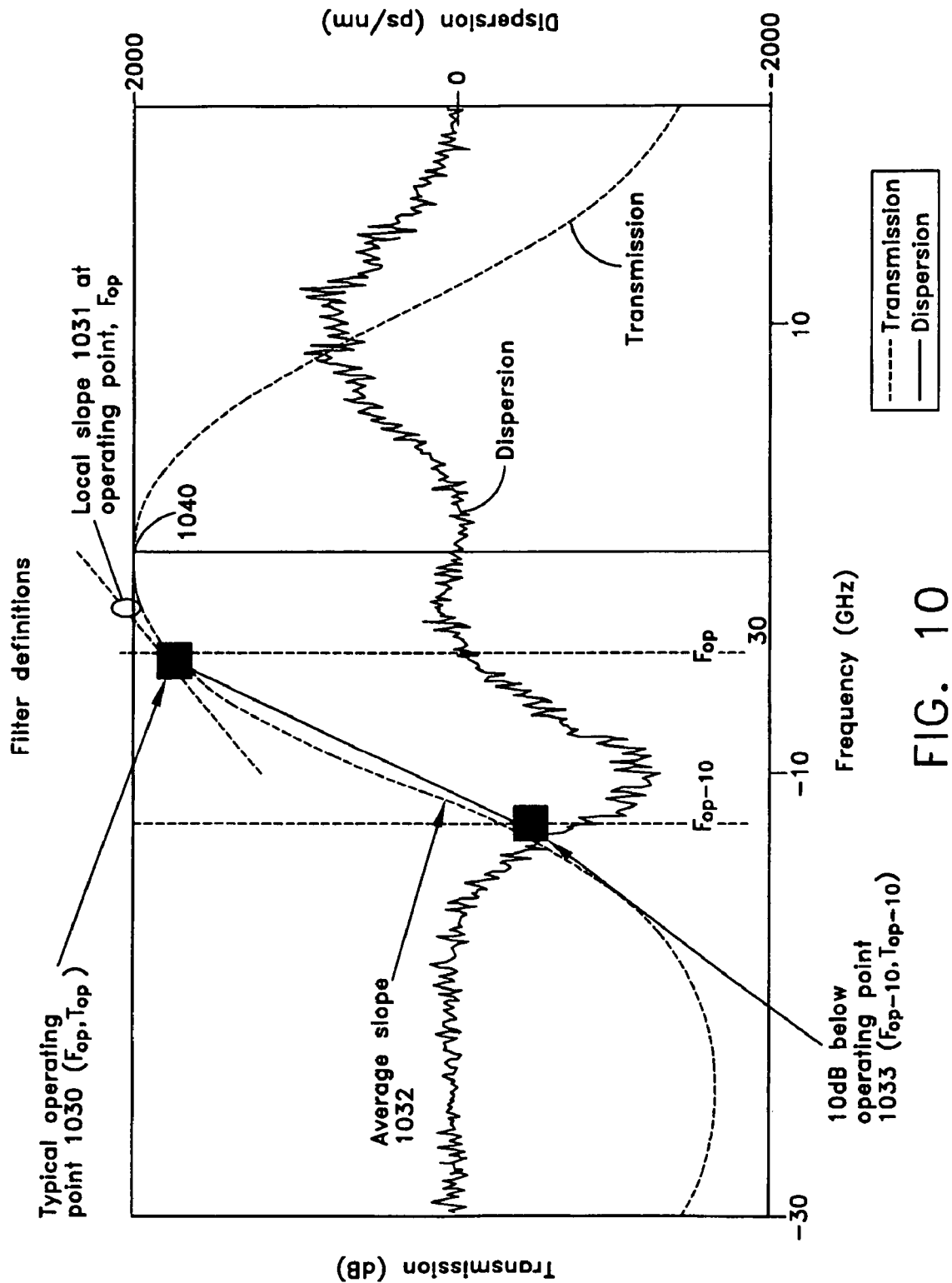
FIG. 10 illustrates the definitions of local and average slope on the logarithmic transmission versus frequency scale.

In order to be useful as an optical discriminator for 10 Gb/s application in a frequency discriminated transmitter, the filter may need to be designed to have high enough slope, while minimizing distortion. FIG. 10 shows the definition of local and average slope on the logarithmic transmission versus frequency scale. On one side of the transmission peak of the filter 1040 a point on the filter may be defined as the operating point 1030. Referring to FIG. 8, the operating point corresponds approximately to the spectral position of the 1s bits, 614, when the filter is used in conjunction with a frequency modulated non-return-to-zero (NRZ) signal. For a directly modulated laser the operating point is typically on the long wavelength side of the transmission peak. The average filter slope may be defined as the ratio:

$$<R> \leq 10 \text{ dB}/(F_{op} - F_{op-10}) \quad (7)$$

where F is frequency in GHz. Typically an average slope of $<R>=0.8$ dB/GHz to 2 dB/GHz may be needed for a 10 Gb/s directly modulated laser. The gaussian filter example of FIG. 9 is ~0.89 dB/GHz, which makes it applicable to frequency-discriminated directly modulated lasers transmitters. A higher slope provides a larger FM to AM conversion and a higher extinction ratio after filter. The slope at the operating point 1030 may be also defined as the first derivative of the logarithmic transmission in dB with optical frequency in GHz:

$$r_{op} = \frac{dT_{op}}{df}. \quad (8)$$

Unwanted FM noise on the 1s bits may be converted to AM noise at the operating point. Thermal chirp, which results from heating of the active region of a directly modulated laser, for example, can cause substantial AM noise after transmission through the filter. To minimize this effect, a small operating slope may be one of the design requirements. For example, the slope on the operating point may be kept below about <0.5 dB/GHz, for an acceptable noise level on the output signal, while maintaining a high average slope.

Figure 12:
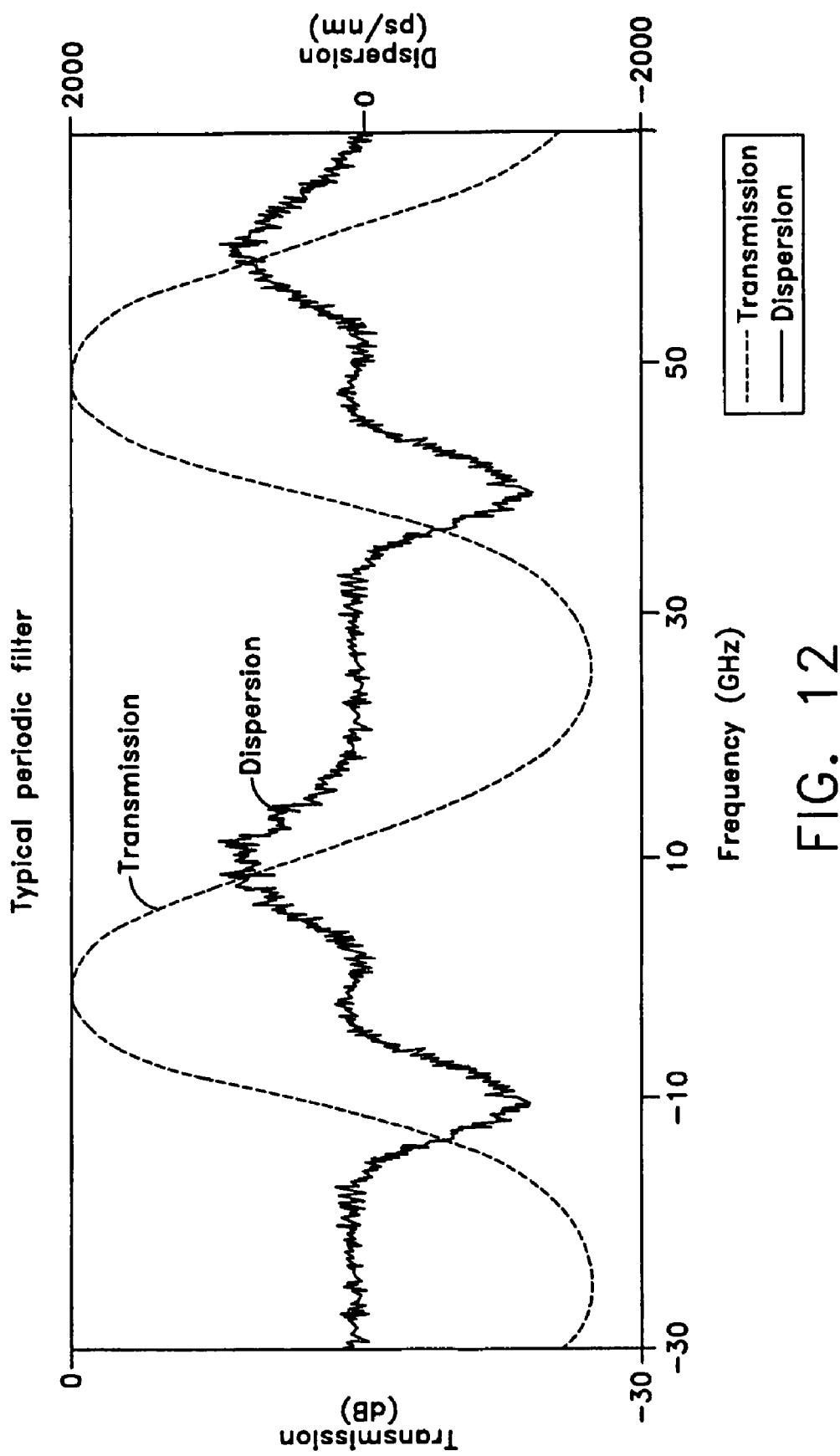
FIG. 12 illustrates transmission as a function of frequency for a periodic filter.

Alternatively a multicavity periodic filter can be used where the cavities are thick films. The thickness of the cavities may be designed to produce a desired free spectral range. For example, FIG. 12 illustrates a periodic filter transmission where frequency differences between two peaks may be chosen as a desired free spectral range. The free spectral range is given by c/2 nd where c is the speed of light; n is the refractive index of the cavity; and d is the cavity thickness. For instance, a fused silica substrate may have a refractive index of 1.444; and if a cavity thickness of 2.08 mm is used, then based on the above formula (7), a free spectral range is about 50 GHz. In telecom applications the free spectral range may vary between about 25 GHz and about 200 GHz.

Figure 11:
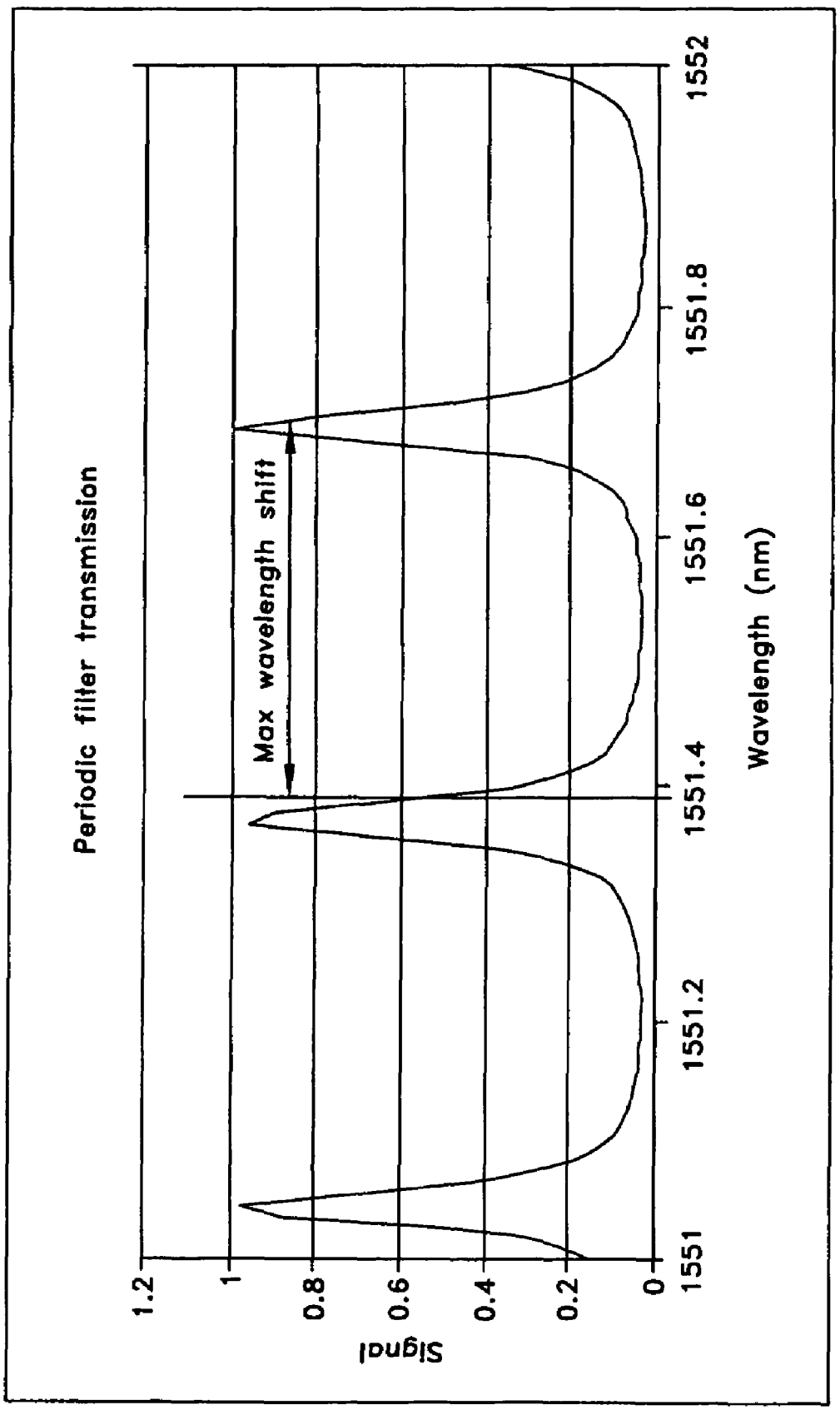
FIG. 11 illustrates a periodic filter transmission where frequency differences between two peaks may be chosen as a desired free spectral range.

With a periodic discriminator filter, peaks may be formed every 50 GHz so that the laser can be tuned to a maximum of 50 GHz (typically a temperature difference of about 4°C.) to get to a filter edge as illustrated in FIG. 11. In addition, the periodic discriminator filter may be used with a tunable laser by choosing a suitable free spectral range. For example, in a telecom system, for a DWDM application a tunable directly modulated laser might be required to be tuned onto the ITU grid with a channel spacing of 50 GHz. With this invention, a periodic filter with a free spectral range of 50 GHz may be used a tunable directly modulated laser tuned to a channel spacing of 50 GHz.

To satisfy telecommunication specifications the quality of the eye that is obtained after the filter may need to be preserved. The shape of the filter can determine the quality of the eye, thereby determining whether the requirements of the telecommunication are met. In general, a Gaussian profile may provide the optimum shape for the filter as illustrated in FIG. 9. Filter dispersion may be used as a monitor of the filter shape, as they are connected through Kramers Kronig relation. To obtain a good eye after the filter, a unipolar substantially flat dispersion profile may be required as shown in FIG. 9 and negative on the long wavelength side of the transmission). The phase of the filter, which is another related parameter, is also nearly linear over the filter bandwidth.

Figure 13:
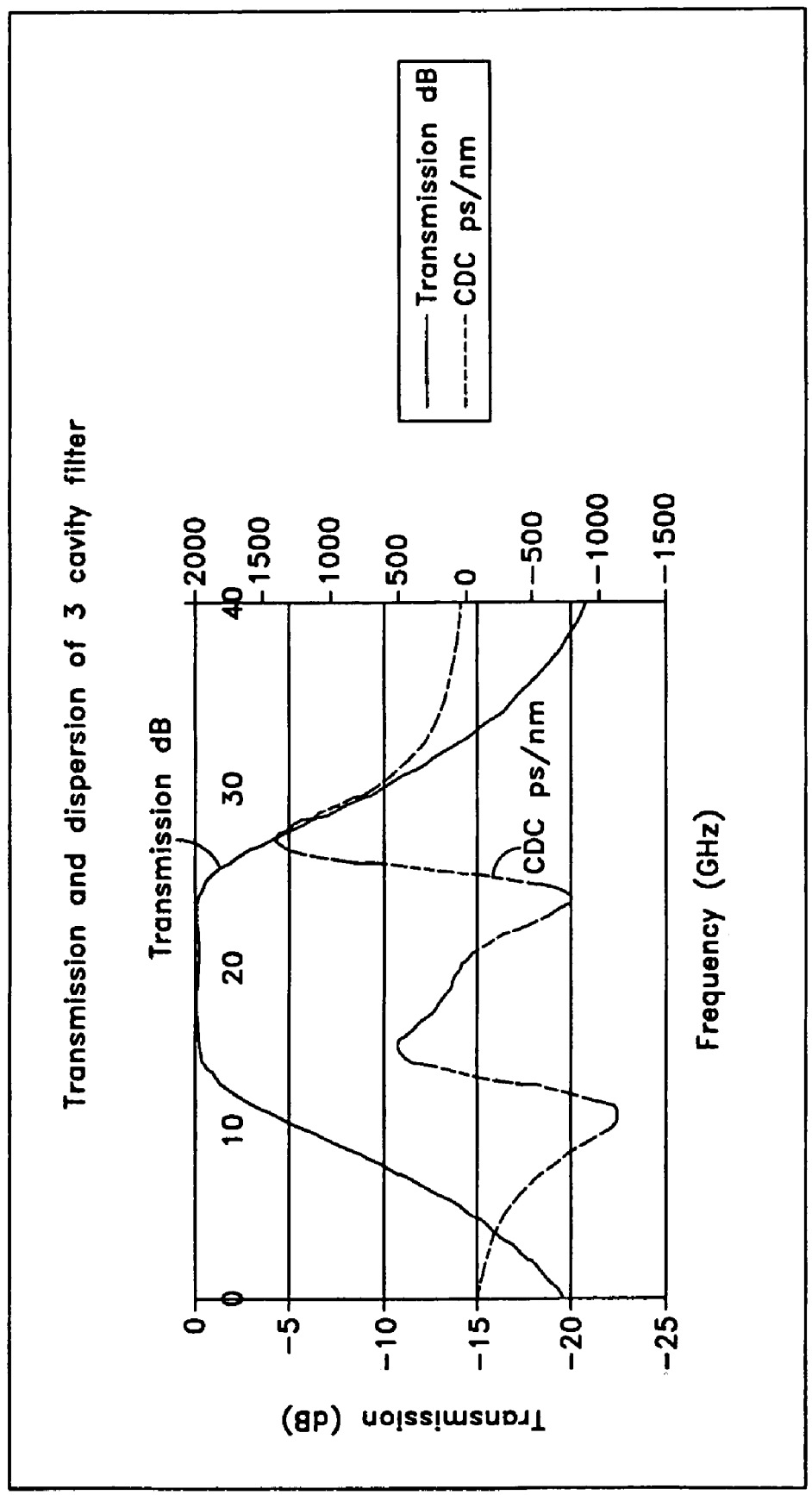
FIG. 13 illustrates a thick multicavity filter design that has a flat top with a corresponding dispersion profile.
Figure 14:
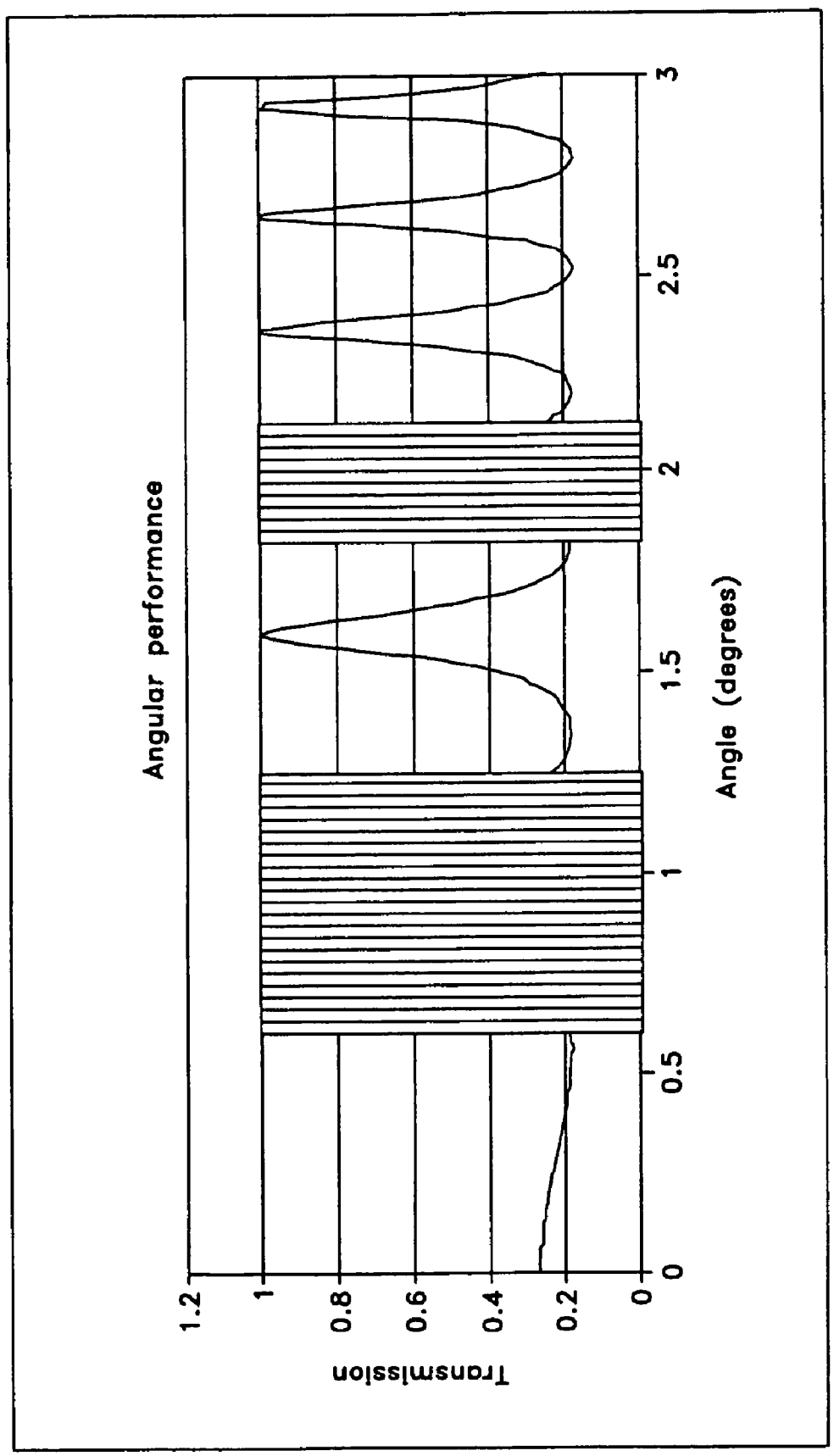
FIG. 14 illustrates transmission relative to an angle for a typical filter at a fixed input wavelength.
Figure 15:
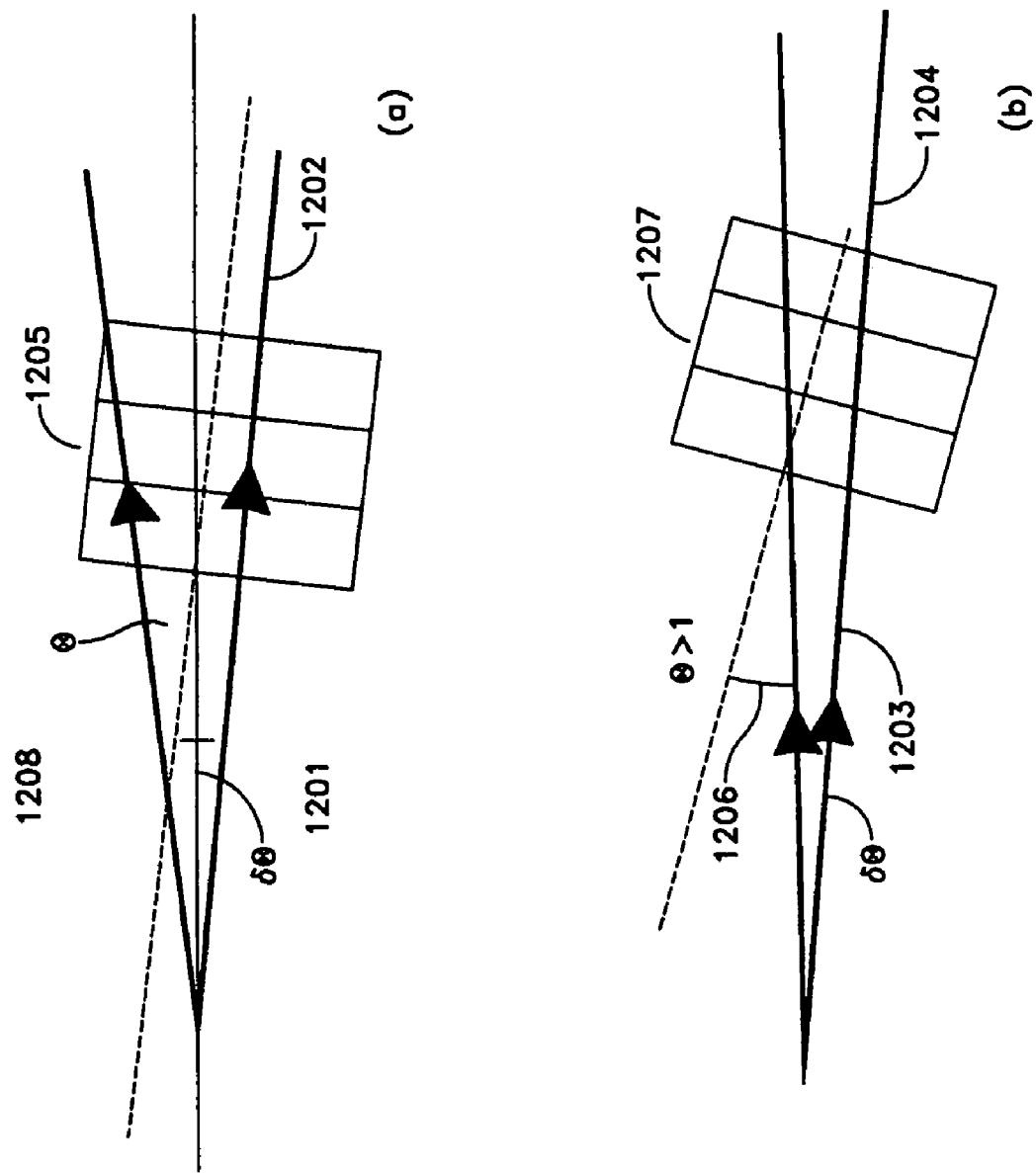
FIG. 15 illustrates different approaches to achieving the smoothing effect because of the periodic nature of the graph of transmission against Angle1/2.

FIG. 13 illustrates a thick multicavity filter design that has a flat top with a corresponding poor dispersion profile. Another way of obtaining a filter with the shape substantially similar to Gaussian profile is by tuning the angle of incident of the optical beam to the surface of the filter to a value higher than 0 degrees. For instance, tuning the angle to about 1 to about 3 degrees may provide a filter having a Gaussian profile. As an example, FIG. 14 illustrates how transmission varies relative to an angle for a typical filter at a fixed input wavelength. A graph of the transmission against $Angle^{1/2}$ may look similar to a graph of transmission against the wavelength. This correlation may be used to change the filter shape. For example, FIG. 15 illustrates a beam incident on a filter with a divergence of 1201 equal to 0.1°. As an approximation this beam contains rays at angles between −0.1° and 0.1°. If this beam is incident upon the filter at an angle of 1208 equal to 1° for example, different parts of the beam have different transmissions. The overall effect is an averaging of the transmission function. This leads to a smoothing of sharp features in the filter function and a shift towards a rounded, Gaussian type filter profile that has unipolar dispersion to achieve the performance characteristics.

FIG. 15 illustrates different approaches to achieving the smoothing effect because of the periodic nature of the graph of transmission against $Angle^{1/2}$. For example, a divergence of 0.4° at an angle of incidence of 1° is equivalent to a divergence of 0.1° at an angle of incidence of 2°. Thus it is possible to use either a low beam divergence 1203 at a large angle of incidence 1206 or a high divergence 1201 at a low angle of incidence 1208. FIG. 16 illustrates an example of the transmission of a periodic three cavity etalon filter incident with an optical beam having a small beam divergence at normal incidence (a) and at an angle 3 degrees (b).

The approach which is adopted depends on the required application. One example is the use of filters in telecoms when stability over life and temperature is required. The corollary of the angular performance shown above is that the filter position is less sensitive to angular changes at low angles of incidence. Since stability is a key requirement for telecommunication applications, the approach of using large divergence at a low angle of incidence is preferred.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. A fiber optic communication system, comprising:
   an optical signal source adapted to produce a frequency modulated signal; and
   a filter adapted to receive the frequency modulated signal and output a substantially amplitude modulated signal where a spectral profile of the filter is substantially similar to a gaussian profile near a transmission peak having a low frequency side and a high frequency side;
where the filter has a substantially negative dispersion on the low frequency side of the transmission peak and a substantially positive dispersion on the high frequency side of the transmission peak.

2. The system according to claim 1, where the quadratic coefficient ranges from about −0.05 dB/GHz$^2$ to about −0.25 dB/GHZ$^2$.

3. The system according to claim 1, where the filter has a logarithmic transmission versus frequency with an average slope of about 1 to about 2 dB/GHz and a slope at an operating point of less than about 0.5 dB/GHz.

4. The system according to claim 1, where the filter has a logarithmic transmission versus frequency with an average slope of about 1 to about 2 dB/GHz and a bandwidth of greater than about 1.2 times the bit rate of operation in GHz.

5. The system according to claim 1, where the filter is a coupled multicavity (CMC) filter.

6. The system according to claim 1, where the CMC filter is formed from alternating high and low refractive index mirrors.

7. The system according to claim 1, where the filter is a periodic filter.

8. The system according to claim 7, where the period is an integer multiple of 25 GHz.

9. A fiber optic communication system, comprising:
an optical signal source adapted to produce a frequency modulated signal; and
a filter adapted to receive the frequency modulated signal and output a substantially amplitude modulated signal where a spectral profile of the filter is substantially similar to a gaussian profile near a transmission peak having a low frequency side and a high frequency side;
where the dispersion on either side of the transmission peak of the filter is substantially constant over a range of frequencies.

* * * * *

UNITED STATES PATENT AND TRADEMARK OFFICE
CERTIFICATE OF CORRECTION

| | |
|---|---|
| PATENT NO. | : 7,492,976 B2 |
| APPLICATION NO. | : 11/441944 |
| DATED | : February 17, 2009 |
| INVENTOR(S) | : Mahgerefteh et al. |

It is certified that error appears in the above-identified patent and that said Letters Patent is hereby corrected as shown below:

Column 1
Line 12, change "continuationinpart" to --continuation-in-part--
Line 42, before "frequency modulated" insert --a--
Line 43, before "substantially" insert --a--

Column 2
Line 20, after "above" insert --a--

Column 3
Line 15, after "receive" insert --a--
Line 25, change "obtained then applying" to --obtained, then applying--

Column 4
Line 63, change "+$D_m$." to --+$D_m$--

Column 5
Line 9, change "group. delay" to --group delay--
Line 55, change "wings if the curve" to --wings of the curve--

Column 6
Line 11, change "is" to --1s--
Lines 28-29, change "compensate" to --compensates--
Line 64, unbold "6"

Column 7
Line 22, change "lasers" to --laser--
Line 66, change "used a" to --used for a--

Signed and Sealed this
Twenty-second Day of February, 2011

David J. Kappos
*Director of the United States Patent and Trademark Office*

Column 8
Lines 11-12, change "transmission)." to --transmission.--

Column 9
Line 9, change "dB/GHZ$^2$" to --dB/GHz$^2$--